UNITED STATES PATENT OFFICE 2,570,058

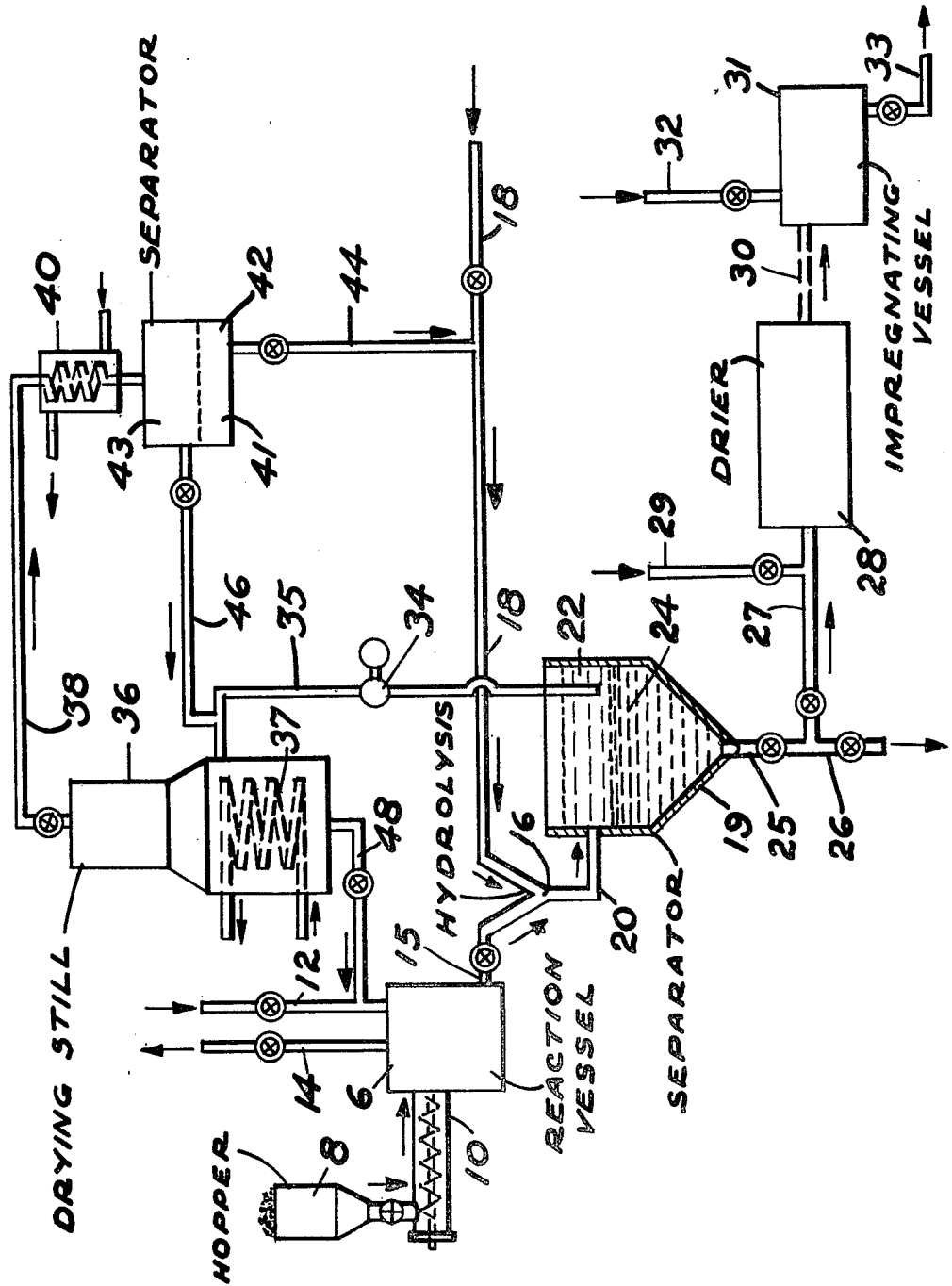

PREPARATION OF MAGNESIA GELS

Edward A. Hunter, Baton Rouge, La., assignor to Standard Oil Development Company, a corporation of Delaware Application July 23, 1949, Serial No. 106,416

8 Claims. (Cl. 252—317)

This invention relates to a process for the preparation of high surface area magnesia gels which may be used alone or in combination with other catalytic agents in the conversion of hydrocarbon materials.

It has been found that alumina and magnesia gels of high surface area can be prepared by forming the corresponding metal alcoholate and hydrolyzing the latter to form the gel and reform the alcohol. In the preparation of gels via the alcoholate reaction, it is necessary to use anhydrous alcohol. In order to make such a process commercially practicable, it would be necessary to recover and reuse the alcohol. However in the case of a water-soluble alcohol, the recovery of the alcohol reformed in the hydrolysis in anhydrous form for reuse in the process would involve a difficult and costly distillation and dehydration. This has been a serious deterrent to the development and use of this process.

It has been proposed to prepare alumina gels by the alcoholate reaction and to overcome the problem of recovering and reconditioning the alcohol for reuse in the process by using a water-insoluble alcohol alone or in admixture with a hydrocarbon diluent. In view of the water-insoluble character of the alcohol, it may be readily separated from the hydrolysis reaction mixture by decantation and then freed of any small amounts of residual water by a simple distillation treatment.

When this method was applied in the preparation of magnesia gels, it was found that the magnesium metal reacts in a satisfactory fashion with low molecular weight, water-soluble alcohols only. The reaction of magnesium metal with alcohols of high enough molecular weight to be practically water-insoluble is very sluggish and difficult to drive to completion. Even the addition of a catalytic amount of a mercury compound fails to make the reaction go at a satisfactory rate.

It is the object of this invention to prepare magnesia gels of high surface area via the alcoholate reaction using water-insoluble alcohols in order to facilitate the recovery and reconditioning of the alcohol for reuse in the process.

It is also the object of this invention to prepare magnesium alcoholates of higher molecular weight, water-insoluble alcohols at a relatively rapid, commercially practicable rate.

These and other objects will appear more clearly from the detailed specification and claims which follow.

It has now been found that the reaction of magnesium metal with water-insoluble alcohols to form the corresponding magnesium alcoholate can be substantially accelerated if there is provided in the reaction mixture in addition to a small catalytic amount of mercuric chloride a small amount of carbon tetrachloride or chloroform. The amount of carbon tetrachloride or chloroform used is preferably from 1 to 20 vol. per cent of the mixture with the alcohol. Larger amounts of carbon tetrachloride or chloroform, even as high as 75 vol. per cent, may be used if desired. In general, when more than 20 vol. per cent of carbon tetrachloride is used in the reaction mixture, it is desirable to add a hydrocarbon solvent or diluent such as a petroleum distillate boiling within the range of 200 to 500° F., preferably within the range of 300° F. to 400° F. to the reaction mixture. The addition of the hydrocarbon diluent serves to control the rate of reaction, helps to regulate the specific gravity of the organic layer after hydrolysis, and reduces the solubility of water in the organic layer.

The alcohols which may be used to prepare magnesium alcoholates in accordance with the present invention are those which are insoluble or have a solubility not greater than about 15 grams per 100 cc. of water and preferably have a solubility less than about 5.3 grams per 100 cc. of water at ordinary room temperature or 70° F. Alcohols which may be used include n-butyl, secondary butyl and isobutyl alcohol although the solubility of these alcohols is somewhat higher than the desired or preferred range. The preferred alcohols include pentanol-1, pentanol-2, 2-methyl butanol-4, 2-methyl butanol-3, pentanol-3, hexanol-1, hexanol-2, hexanol-3, methyl pentanols, dimethyl butanols, heptyl and octyl alcohols. Instead of using the alcohols singly, mixed alcohols such as mixed amyl alcohols may be used or mixture of alcohols of different molecular weight may be used.

In order to carry out the reaction of the magnesium metal with the higher molecular weight $C_4$ and higher alcohols even in the presence of chloroform or carbon tetrachloride, it is necessary to have a small, catalytic amount of mercury compound such as mercuric chloride, mercuric acetate or mercuric nitrate, present in the reaction mixture. The amount of mercury compound present is ordinarily between 0.01 and 0.1 wt. per cent mercury based upon the magnesium, preferably from 0.02 to 0.04%.

The rate of reaction between the magnesium and the alcohol is dependent upon the temperature of the reaction mixture. Ordinarily some heating is necessary to get the reaction started but when it is well started it is normally self-sustaining and in fact it may be necessary to cool the reaction mixture in order to remove some of the heat of reaction. The reaction is conducted at temperatures between 200 and 400° F., preferably between 250 and 350° F. Ordinarily the temperature of the reaction is controlled to maintain it a little below the boiling point of the reaction mixture.

Upon completion of the formation of the magnesium alcoholate, it is subjected to hydrolysis in order to form a slurry of hydrous magnesia in water and to reform the alcohol. Hydrolysis may be effected by treating the alcoholate either with water or aqueous solutions of other catalyst components at temperatures of 60 to 200° F. The slurry of hydrous magnesia in water can be readily separated from the mixture of alcohol and chloroform or carbon tetrachloride or the mixture of alcohol, hydrocarbon and chloroform or carbon tetrachloride by decantation or the like. The latter mixtures contain a small amount of residual water as entrained and dissolved water and may be freed of this residual water by a simple process of distillation in order to render it suitable for reuse in the process. The vapor taken overhead from the drying distillation is condensed and after settling, a water layer and organic liquid layer are formed whereupon the latter may be recycled to the drying process.

The accompanying drawing illustrates diagrammatically a suitable flow plan of the process in accordance with this invention. Referring to the drawing, 6 is a reaction vessel for containing the reactants. It should preferably be provided with a jacket or with coils or tubes for circulation of a suitable heat exchange liquid in indirect heat exchange relation to the reactants in order to control the temperature of the reaction mixture. Metallic magnesium in the form of chips or turnings is charged into reactor 6 from storage hopper 8 by means of the screw conveyor 10. Alcohol, carbon tetrachloride or chloroform and liquid hydrocarbon diluent if desired are supplied to the reaction vessel initially through line 12 and any further amounts of these materials required as make-up during the conduct of the process are also supplied to the system through this line. Catalytic amounts of mercuric chloride or other suitable mercury compound may also be introduced through line 12. The reaction vessel is equipped with a line 14 for venting off vaporous products including hydrogen. In view of the high degree of purity of the hydrogen formed, it may be separated from the condensable carry-over compressed and stored in any suitable equipment (not shown).

The reaction mixture comprising a solution of magnesium alcoholate in excess alcohol, carbon tetrachloride or chlorofrom and hydrocarbon diluent is withdrawn from reaction vessel 6 and passed through line 15 into the hydrolysis zone 16. Water or other hydrolyzing liquid is supplied to hydrolysis zone 16 through line 18. The hydrolysis zone 16 may comprise a two fluid mixing nozzle, a centrifugal pump or other device for effecting thorough intimate mixing of the two fluids with each other. The temperature at the hydrolysis zone 16 may be between 70 and 200° F. The hold-up in the hydrolysis zone 16 is sufficiently prolonged to substantially complete the hydrolysis and to reform the alcohol.

The hydrolysis reaction mixture is transferred from zone 16 through line 20 into separator 19 wherein it is permitted to remain in a substantially quiescent state for from 1 to 10 hours in order to permit the mixture to separate into two distinct layers. Unless the amount of carbon tetrachloride used exceeds about 20%, the upper of the two layers 22, will comprise the organic liquids while the lower of said layers 24, will be an aqueous layer comprising a slurry of hydrous magnesia in water. The separator vessel 19 and its contents should be maintained at a temperature of about 70 to 200° F., preferably at 150 to 180° F. since settling appears to be somewhat better in this range. Separation of the hydrolysis reaction mixture into layers may be facilitated by very slowly stirring the contents of the separator. The amount of water or hydrolyzing liquid added at the hydrolyzing zone 16 should be sufficient to give about a 3 to 5% slurry of hydrous magnesia in the aqueous layer 24. The slurry of magnesia in water can be concentrated to as high as about 10 wt. per cent solids by continued settling. Water may be withdrawn from the top of the settled slurry and recycled or reused in the hydrolysis step to recover any suspended magnesia it may contain.

The slurry of hydrous magnesia is withdrawn from the bottom of settling tank 19 through line 25 whence it may be passed through line 26 to another settling chamber (not shown) to concentrate the slurry further. Alternatively the slurry may be passed through line 27 into drier 28. If an impregnated magnesia gel is desired, impregnating agent or catalytic component can be passed through line 29 and combined with the hydrous magnesia and the mixture then passed into the drier 28. Alternatively, an impregnating vessel can be provided before the drier or as shown a line 30 can be provided for conveying dried or partially dried magnesia into an impregnating vessel 31 wherein the magnesia can be composited with other active catalytic components supplied through line 32, the impregnated magnesia being withdrawn from vessel 31 through line 33 and conveyed to suitable drying and pelleting or other shaping equipment.

The organic liquid layer 22 is removed from separator 19 by means of pump 34 and is conveyed through line 35 into drying still 36. Heating fluid is circulated through coil 37 in still 36 in order to heat the organic liquid sufficiently to drive off the water entrained or dissolved in the organic liquid mixture. Vapors are taken overhead from still 36 through line 38 and are condensed in cooler or condenser 40, the condensate passing into separator 42 wherein it separates into a lower or water layer 41 and an upper organic liquid layer. The water layer is withdrawn from separator 42 through line 44 and then recycled to the hydrolysis zone along with fresh hydrolyzing liquid supplied through line 18. The organic liquid layer 43 is withdrawn from separator 42 through line 46 and combined with the organic liquid passing to the drying still 36. The organic liquid freed from residual water in the drying still 36 is withdrawn therefrom through line 48 and is recycled to the reaction vessel. Losses of any of the organic liquid components as well as catalytic material is supplied to the system through line 12 in order to maintain substantially constant conditions in the system.

The following examples are illustrative of the present invention.

Example 1

0.2 g. Mg turnings were covered with 20 cc. of anhydrous n-amyl alcohol containing a small amount of HgCl₂. The mixture was brought to a vigorous boil. The flame was removed and the reaction was observed to proceed at a moderate rate which, however, rapidly decreased. The decrease is apparently associated with a deposit of reaction product on the surface of the magnesium turnings.

0.2 g. Mg turnings were covered with 20 cc. of a mixture of 95% anhydrous n-amyl alcohol and 5% carbon tetrachloride containing about 0.05 wt. per cent of HgCl₂. The mixture was brought to a vigorous boil. The flame was removed and the reaction was observed to proceed vigorously to essentially complete solution of the Mg. This demonstrates the catalytic or activating effect of carbon tetrachloride upon the formation of magnesium alcoholate with a water-insoluble alcohol.

Example 2

0.2 g. Mg turnings were covered with 20 cc. of a 50–50 mixture of anhydrous n-amyl alcohol and Varsol containing a small amount of HgCl₂. To this mixture there was added 0.5 cc. (2.5%) CCl₄. The mixture was brought to a vigorous boil. The flame was removed and the reaction was found to proceed vigorously without further heating. At the end of 15 minutes the reaction was essentially complete.

In order to demonstrate the desirability of including a catalytic amount of HgCl₂ in the reaction mixture, the following run was made.

0.2 g. Mg turnings were covered with 20 cc. of a 50–50 mixture of anhydrous n-amyl alcohol and Varsol. To the mixture there was added 0.5 cc. (2.5%) CCl₄. The mixture was brought to a vigorous boil. When the flame was removed, no observable reaction was taking place and at the end of two hours, no observable reaction had taken place.

Example 3

0.2 gram magnesium was covered with a mixture comprising 4 cc. CCl₄ (20%), 8 cc. anhydrous n-amyl alcohol (40%), and 8 cc. Varsol (40%). To this mixture there was added a catalytic amount of HgCl₂. The mixture was brought to a vigorous boil. The external heat source was then removed and the reaction proceeded to complete solution of the magnesium, the heat of reaction keeping the mixture boiling.

Example 4

0.2 g. Mg covered with 20 cc. 2 ethylhexanol. Add 1 cc. CCl₄ (5%) and a catalytic amount of HgCl₂. Bring to a vigorous boil and remove heat source. Mg goes to essentially complete solution in about 10 minutes, the heat of reaction keeping the mixture boiling.

Example 5

0.2 g. Mg turnings covered with a mixture of 10 cc. Varsol (40%), 10 cc. n-amyl alcohol (40%) and 5 cc. chloroform (20%). Add a catalytic amount of HgCl₂. Bring to a vigorous boil and remove external heat source. Mixture continues to boil from the heat of reaction, solution of the Mg being essentially complete after about 15 minutes.

Heated for a short period to complete reaction. Add slowly to 2 volumes (50 cc.) water with agitation to hydrolyze. After settling, the organic layer and some water are decanted off. The aqueous slurry is dried to form MgO.

The foregoing description contains a limited number of embodiments of this invention. It will be understood that numerous variations are possible without departing from the scope of the following claims.

What is claimed is:

1. The method which comprises reacting magnesium metal with an alkanol containing at least four carbon atoms in each molecule in the presence of a halogenated hydrocarbon selected from the group consisting of chloroform and carbon tetrachloride and a catalytic amount of a mercury compound in order to form the corresponding magnesium alcoholate.

2. The method which comprises reacting magnesium metal with an alkanol containing at least four carbon atoms in each molecule in the presence of a hydrocarbon diluent, a halogenated hydrocarbon selected from the group consisting of chloroform and carbon tetrachloride and a catalytic amount of a mercury compound in order to form the corresponding magnesium alcoholate.

3. The method which comprises reacting magnesium metal with amyl alcohol in the presence of a paraffinic hydrocarbon diluent boiling between 200 and 500° F., a halogenated hydrocarbon selected from the group consisting of chloroform and carbon tetrachloride and a catalytic amount of a mercury compound.

4. The method as defined in claim 3 wherein the alcohol is n-amyl alcohol, the hydrocarbon diluent boils within the range of 300 to 400° F., the halogenated hydrocarbon is carbon tetrachloride and the mercury compound is mercuric chloride.

5. The method which comprises reacting magnesium metal with an alkanol containing at least four carbon atoms in each molecule in the presence of a halogenated hydrocarbon selected from the group consisting of chloroform and carbon tetrachloride and a catalytic amount of a mercury compound in order to form the corresponding magnesium alcoholate, hydrolyzing the alcoholate permitting the hydrolysis reaction mixture to separate into an aqueous and an organic liquid layer, recovering hydrous magnesia from the aqueous layer, subjecting the organic liquid layer to distillation to separate residual water from the organic liquids and reusing the organic liquid in the formation of further quantities of magnesium alcoholate.

6. The method which comprises reacting magnesium metal with an alkanol containing at least four carbon atoms in each molecule in the presence of a hydrocarbon diluent, a halogenated hydrocarbon selected from the group consisting of chloroform and carbon tetrachloride and a catalytic amount of a mercury compound in order to form the corresponding magnesium alcoholate, hydrolyzing the alcoholate, permitting the hydrolysis reaction mixture to separate into an aqueous and an organic liquid layer, recovering hydrous magnesia from the aqueous layer, subjecting the organic liquid layer to distillation to separate residual water from the organic liquids and reusing the organic liquid in the formation of further quantities of magnesium alcoholate.

7. The method which comprises reacting magnesium metal with amyl alcohol in the presence of a paraffinic hydrocarbon diluent boiling between 200 and 500° F., a halogenated hydrocarbon selected from the group consisting of chloroform and carbon tetrachloride and a catalytic amount of a mercury compound, hydrolyzing the alcoholate, permitting the hydrolysis reaction mixture to separate into an aqueous and an organic liquid layer, recovering hydrous magnesia from the aqueous layer, subjecting the organic liquid layer to distillation to separate residual water from the organic liquids and reusing the organic liquid in the formation of further quantities of magnesium alcoholate.

8. The method as defined in claim 7 wherein the alcohol is n-amyl alcohol, the hydrocarbon diluent boils within the range of 300 to 400° F., the halogenated hydrocarbon is carbon tetrachloride and the mercury compound is mercuric chloride.

EDWARD A. HUNTER.

REFERENCES CITED

The following references are of record in the file of this patent:

UNITED STATES PATENTS

| Number | Name | Date |
|---|---|---|
| 2,287,088 | Cohen | June 23, 1942 |
| 2,491,033 | Byrns et al. | Dec. 13, 1949 |